Sept. 13, 1966 T. MOLLINGA 3,273,078

DOUBLE SIDEBAND SUPPRESSED CARRIER MODULATOR

Filed July 1, 1963 2 Sheets-Sheet 1

INVENTOR.
THOMAS MOLLINGA
BY
Christie, Parker & Hale
ATTORNEYS.

INVENTOR.
THOMAS MOLLINGA
BY
Christie, Parker & Hale
ATTORNEYS.

United States Patent Office 3,273,078

Patented Sept. 13, 1966

3,273,078
DOUBLE SIDEBAND SUPPRESSED CARRIER MODULATOR

Thomas Mollinga, Sierra Madre, Calif., assignor to Burroughs Corporation, Detroit, Mich., a corporation of Michigan Filed July 1, 1963, Ser. No. 291,853
6 Claims. (Cl. 332—43)

This invention relates to balanced modulators and, more particularly, to a simple, efficient, non-critical balanced modulator.

In amplitude modulation, it is often desirable to effect double sideband suppressed carrier modulation. This is true because of the considerable power contained in the carrier which, when transmitted, carries no information. The double sideband suppressed carrier modulation is generally produced by employing a balanced modulator.

Balanced modulators in the past have employed many different components and have taken many different configurations. However, the basic balanced modulator employs a diode bridge wherein the modulating signal is applied to two terminals of the bridge and the carrier signal controls the operation of two of the diodes. Such a balanced modulator requires that the diodes be exactly matched. Additionally, diode bridges are very inefficient, and for proper operation, the amplitude of the carrier signal must be greater than the amplitude of the modulating signal. The inefficiency of the diodes may be overcome by employing active elements such as transistors. However, the problem of matching still exists. Further in the balanced modulators, the output signal contains undesirable harmonics, especially even order harmonics. Therefore, in order to eliminate the even order harmonics, the carrier signal is applied in the form of a square wave. Thus, an external means for producing a square wave for application to the diode bridge is usually required.

It is desirable to produce a balanced modulator to effect double sideband suppressed carrier modulation, which does not require the critical matching of components and does not have the inefficiencies present when diode bridges are employed. Additionally, it is desirable to have a modulator that does not require an exacting relationship between the amplitudes of the two signals to be combined in the modulator.

Therefore, in accordance with the present invention, the improved modulator comprises means for splitting the output signal from a first signal source, such as a modulating signal source. The splitting means may be a center-tapped transformer or an electronic phase splitter so that the output of the splitting means consists of two signals having equal amplitude and opposite phase. These two signals are applied to two opposite terminals of a bridge network. The bridge network includes two pairs of diodes connected back to back in two adjacent arms and two electronic switches connected in the other two adjacent arms. The load is connected between the other two pairs of terminals of the bridge network. The electronic switches are responsive to the output of a second signal source which may provide the carrier signal. The output of the second signal source is split into two signals of substantially equal amplitude and opposite phase. The two signals are applied to the electronic switches through a current sensitive device to produce a square wave signal at the frequency of the second signal source. Additionally, there is provided an interconnecting means between the two switches for making them alternately and synchronously operative.

These and other features and advantages of the present invention will be understood more clearly and fully upon consideration of the following specification and drawing, in which.

Figure 1:
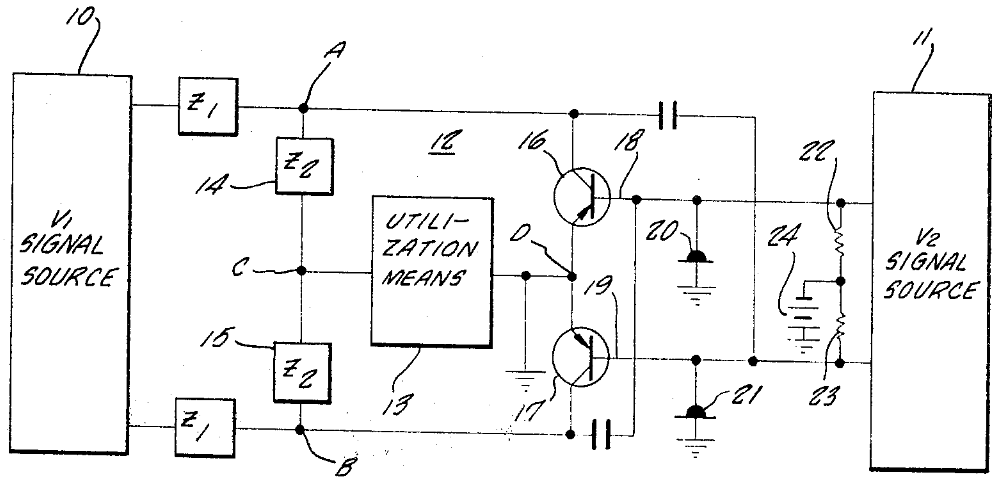
FIG. 1 is a schematic diagram, partially in block form, of a balanced modulator, in accordance with the present invention.

The balanced modulator of FIG. 1 is connected to a first source 10, which may supply the modulating signal for the system. The modulator is additionally connected to a second source 11, which may supply the carrier signal for the system. The output of signal source 10 is connected to two terminals A and B of a bridge network 12. The other two terminals C and D of the bridge network 12 are connected to a utilization means 13.

The bridge network comprises a pair of substantially matched impedance elements 14 and 15. The other two arms of the bridge include two electronic switches, which comprise a transistor 16 and a transistor 17. The transistors 16 and 17 are connected as class C amplifiers or switches to effectively produce a square wave signal in response to the application of an input signal from signal source 11. The control terminals of the transistor switches or base 18 and base 19 of transistors 16 and 17, respectively, are connected to a voltage level determining circuit in the form of a tunnel diode 20 and a tunnel diode 21. The tunnel diodes are initially biased to set the voltage level of the circuit through resistors 22 and 23, respectively, by connection to a source 24.

Figure 2:
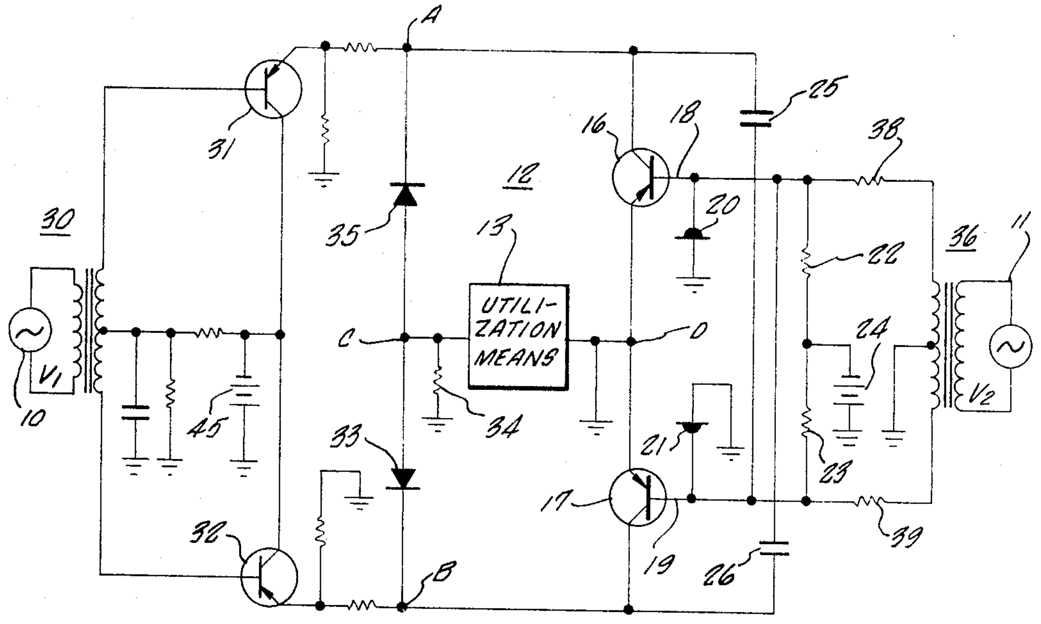
FIG. 2 is a schematic diagram showing the balanced modulator of FIG. 1 in detail.

The operation of the balanced modulator may be understood more easily upon consideration of the detailed circuitry shown in FIG. 2. The components of FIGS. 1 and 2 which are analogous have the same reference numerals in FIG. 2 as they do in FIG. 1. The output of signal source 10 is applied to a means for splitting the signal into two signals having substantially equal amplitude and opposite phase. This splitting means is shown as a center-tapped transformer 30. However, it is noted that the means for splitting the signal could be alternatively an electronic phase splitter such as a linear amplifier with two equal valued load resistors. The output of the center-tapped transformer 30 is applied to the bridge network 12 through individual buffer amplifiers 31 and 32. The buffer amplifiers are in the form of emitter followers to provide isolation between the input signal source and the bridge network 12.

The bridge network 12 includes a pair of diodes 35 and 33 connected in a back to back relationship in adjacent arms. The junction point C between the two diodes is connected to the utilization means 13. Additionally, a resistor 34 is connected between ground reference and the junction point C to provide a circuit for the development of the output signal. The other terminal D of the bridge network 12 is connected directly to ground reference.

The second signal source 11 is applied to a center-tapped transformer 36, which acts as a means for splitting the input signal from source 11 into two signals that are opposite in phase and have substantially equal amplitudes. The center-tapped transformer 36 could also be replaced by an electronic phase splitter. The two signals in the output of the center-tapped transformer 36 are applied to the control terminals or bases 18 and 19 of transistors 16 and 17 through resistors 38 and 39, respectively. The combination of transistor 16 and tunnel diode 20 and the combination of transistor 17 and tunnel diode 21 form electronic switches which produce a square wave output at the frequency of the signal from signal source 11.

With no input signal from source 11 and source 10, there will be a current flow from the ground reference through resistor 34 which will split and flow through diodes 35 and 33 to a source 45 through the emitter collector path of transistors 31 and 32. The potential at point A and point B will thus remain constant until an input signal is applied from source 10 or source 11. Upon the application of an input signal from source 11, the tunnel diode transistor combinations will alternately switch to alternately place ground reference at points A and B. Therefore, the application of a signal from source 11 effectively causes a square wave signal to appear at points A and B which will have a frequency determined by the frequency of the signal from source 11. The operating characteristics of the tunnel diode-transistor combination are shown in FIG. 3.

Figure 3:
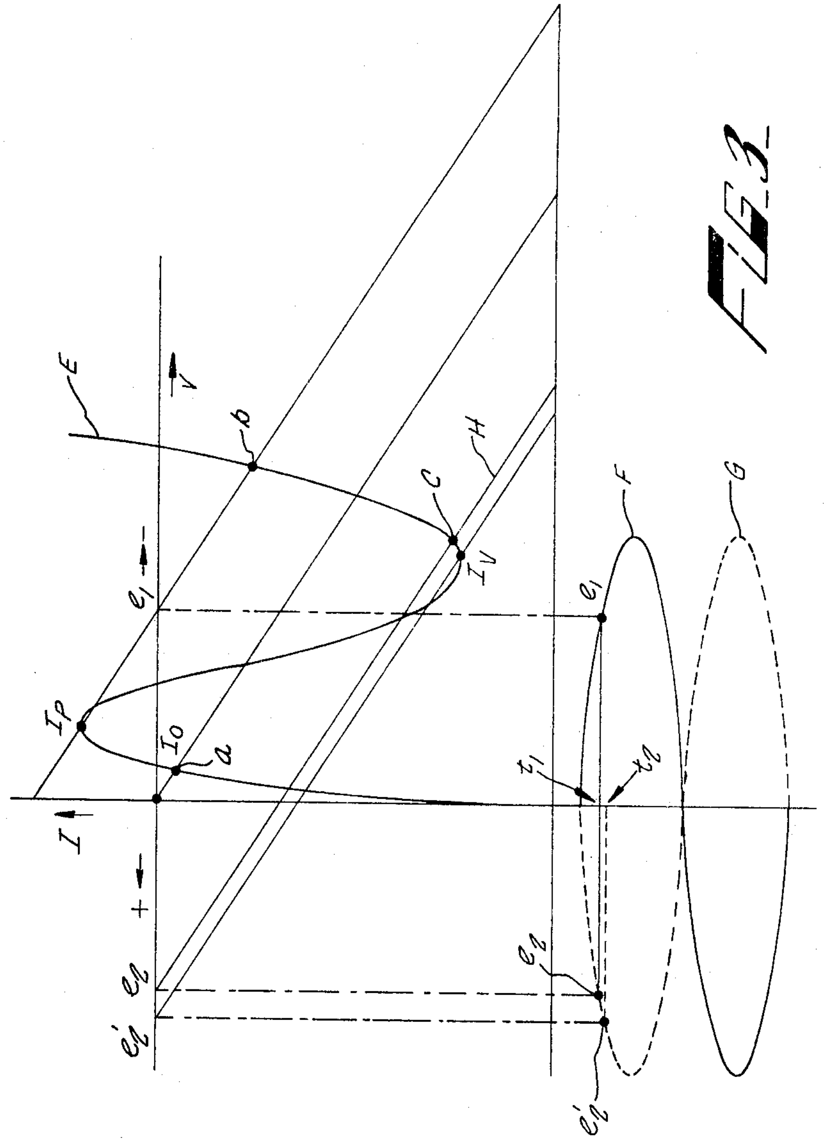
FIG. 3 is a pictorial diagram of the operating characteristics of a portion of the balanced modulator of FIG. 2.

Now referring to FIG. 3, it is seen that the tunnel diode transistor combination has an input characteristic curve E similar to that of a tunnel diode alone. The tunnel diodes of FIG. 2 are initially biased through resistors 22 and 23 to source 24. The initial bias places the reference axis for zero input signal from source 11 slightly below the peak point current $I_p$ of the characteristic curve E. A load line, as determined by the value of resistor 38 or resistor 39, is drawn from the point of intersection of the two reference axes and intersects the input characteristic curve E at point *a*. This determines the quiescent current $I_0$, which exists in the tunnel diodes for zero input signal from source 11.

The reference axis for current through the combination for zero voltage input from source 11 is projected below the characteristic curve. The input signals appearing at the output of center-tapped transformer 36 are superimposed upon this reference axis as curves F and G. Curve F represents the signal that is applied to transistor 16 and diode 20 while curve G represents the signal that is applied to transistor 17 and diode 21. It is assumed, for illustrative purposes, that the input characteristics of the tunnel diode-transistor combination of the two transistor-tunnel diode combinations are equal and are both represented by curve E. However, in actual practice, the two curves for the tunnel diode-transistor combinations will generally not be equal but the theory of operation remains the same.

As the input signal represented by waveform F is applied to tunnel diode 20, the current therethrough will increase. The load line will move up the curve E to the point $I_p$ or the peak point current, where the tunnel diode will change states. The tunnel diode will go from the low voltage-high current state to the high voltage-low current state and will now operate at point *b*. At this instant when the tunnel diode 20 changes states, the high voltage that appears across it will be sufficient to trigger transistor 16 into its on position. The turning on of transistor 16 will essentially apply the ground reference to point A in FIG. 2. At the instant that the input signal applied to transistor 16 is of sufficient magnitude to switch tunnel diode 20 and transistor 16, the other signal represented by waveform G will be at a point 180° out of phase. Therefore, looking at the curves of FIG. 3 and assuming that the characteristic curve E is the same for both of the tunnel diode-transistor combinations, a projection of a load line H intersects the characteristic curve at point *c*. Tunnel diode 21 will not have reached the valley point current $I_v$, which is required to cause tunnel diode 21 to change state.

Thus, a feedback circuit is provided in FIG. 2 in the form of a capacitor 25 between terminal A and the control terminal or base 19 of transistor 17. Thereafter, when the transistor 16 turns on, the voltage at terminal A will change precipitously. This change will be coupled through capacitor 25 to transistor 17 to simultaneously change the states of transistor 17 and tunnel diode 21. Thus, synchronous operation is effected between the two electronic switches.

Conversely, when the input signal to transistor 17 is of the correct polarity to cause the change in the state of tunnel diode 21 to turn on transistor 17, a signal will be coupled through a capacitor 26 to cause the synchronous turning off or changing of states of transistor 16 and tunnel diode 20. Therefore, transistors 16 and 17 always change state at the same time.

The synchronous operation of the electronic switches eliminates the necessity for exact matching of the transistors by putting the primary control in the tunnel diodes. Additionally, small differences in the magnitude of the input signals from the source 11 through center-tapped transformer 36 is no longer of any consequence because of the feedback circuitry including capacitors 25 and 26. Therefore, a non-critical push-pull switching system results.

What is claimed is:

1. A modulator comprising a first source of signals, means for splitting the output signals from the first source into two signals having equal amplitude and opposite phase, the splitting means having two output terminals with each terminal having an individual one of the two signals appearing thereon, a pair of diodes connected back to back, means for utilizing the output signal of the modulator connected between the junction point of the diodes and ground reference, means for connecting one output terminal of the splitting means to one diode, means for connecting the other output terminal from the splitting means to the other diode, a second source of signals, means for splitting the output signal of the second source into two signals of substantially equal amplitude and opposite phase, two current sensitive devices connected between ground reference and the output of the second splitting means, a first transistor switch having a control terminal responsive to the conductivity state of the first current sensitive device, means for connecting the first transistor switch between the first output terminal of the first splitting means and ground reference, a second transistor switch having a control terminal responsive to the conductivity state of the second current sensitive device, and means for connecting the second transistor switch between the second output terminal of the first splitting means and the ground reference.

2. A modulator in accordance with claim 1 wherein the current sensitive devices are tunnel diodes.

3. A modulator comprising a first source of signals, means for splitting the output signals from the first source into two signals having equal amplitude and opposite phase, the splitting means having two output terminals with each terminal having an individual one of the two signals appearing thereon, a pair of diodes connected back to back, means for utilizing the output signal of the modulator connected between the junction point of the diodes and ground reference, means for connecting one output terminal of the splitting means to one diode, means for connecting the other output terminal from the splitting means to the other diode, a second source of signals, means for splitting the output signal of the second source into two signals of substantially equal amplitude and opposite phase, two current sensitive devices connected between ground reference and the output of the second splitting means, a first transistor switch having a control terminal, an output terminal and a common terminal, means for connecting the control terminal of the first transistor switch to one of the current sensitive devices, means for connecting the first transistor switch between the first output terminal of the first splitting means and ground reference by connecting the output terminal of the transistor switch to the first output terminal of the first splitting means and the common terminal of the transistor switch to ground reference, a second transistor switch having a control terminal, an output terminal and a common terminal, means for connecting the control terminal of the second transistor switch to the other current sensitive device, means for connecting the second transistor switch between the second output terminal of the first splitting means and the ground reference by connecting the output terminal of the transistor switch to the second output terminal of the first splitting means and the common terminal of the transistor switch to ground reference, and interconnecting means between the two transistor switches for making them alternately and synchronously operative.

4. A modulator in accordance with claim 3 wherein the interconnecting means comprises a first capacitor connected between the output terminal of the first transistor switch and the control terminal of the second transistor switch and a second capacitor connected between the output terminal of the second transistor switch and the control terminal of the first transistor switch.

5. A balanced modulator for producing double side band suppressed carrier modulated signals comprising a first source of modulating signals, means for splitting the modulating signals into two signals having substantially equal amplitude and opposite phase relationships, means for utilizing the output signal of the balanced modulator, a diode corresponding to each of the two modulating signals, means for applying each signal in parallel through its corresponding diode to the utilization means, means for forward biasing both diodes, a source of carrier signals, means responsive to the carrier signal source for alternately shunting to ground reference for substantially equal amounts of time each of the two modulating signals so as to back bias the corresponding diode.

6. In combination a first signal source, a second signal source, utilization means, a balanced modulator comprising first and second terminals, first means for splitting the first signal into two signals of substantially equal amplitude and opposite phase appearing at the first and second terminals respectively, a diode connected between each terminal and one side of the utilization device, the diodes being forward biased, second means for splitting the second signal into two signals of substantially equal amplitude and opposite phase, means for alternately and synchronously shunting to ground reference for a substantially equal amount of time each of the two terminals so as to back bias the diode alternately, and means for making the shunting means responsive to the two signals from the second splitting means.

References Cited by the Examiner

UNITED STATES PATENTS

| | | | |
|---|---|---|---|
| 2,943,271 | 6/1960 | Willis | 332—43 |
| 2,962,603 | 11/1960 | Bright | 307—88.5 |
| 3,027,522 | 3/1962 | Boxall et al. | 332—44 |
| 3,201,613 | 8/1965 | Amodei | 307—88.5 |

HERMAN KARL SAALBACH, *Primary Examiner.*

ROY LAKE, *Examiner.*

P. L. GENSLER, *Assistant Examiner.*